US012599109B2

(12) United States Patent
Coady et al.

(10) Patent No.: US 12,599,109 B2
(45) Date of Patent: Apr. 14, 2026

(54) DUALLY DRIVE WHEEL ASSEMBLY

(71) Applicant: PERDUE FOODS LLC, Salisbury, MD (US)

(72) Inventors: Daniel J. Coady, Warner Springs, CA (US); Alex Ackley, Manhattan, KS (US)

(73) Assignee: PERDUE FOODS LLC

( * ) Notice: Subject to any disclaimer, the term of this patent is extended or adjusted under 35 U.S.C. 154(b) by 528 days.

(21) Appl. No.: 17/492,482

(22) Filed: Oct. 1, 2021

(65) Prior Publication Data

US 2023/0105217 A1 Apr. 6, 2023

(51) Int. Cl.
| | |
|---|---|
| *A01K 3/00* | (2006.01) |
| *A01K 1/00* | (2006.01) |
| *B60K 7/00* | (2006.01) |
| *B62D 11/02* | (2006.01) |

(52) U.S. Cl.
CPC ............ *A01K 3/001* (2021.08); *A01K 1/0035* (2013.01); *B60K 7/0007* (2013.01); *B62D 11/02* (2013.01)

(58) Field of Classification Search
CPC ........ A01K 3/00; A01K 3/001; A01K 1/0035; A01K 1/105; B60K 2007/0069; B60K 7/0007; B60K 2007/0038; B60B 33/02
See application file for complete search history.

(56) References Cited

U.S. PATENT DOCUMENTS

| | | | |
|---|---|---|---|
| 4,341,181 A | 7/1982 | Fair | |
| 4,566,391 A | 1/1986 | Haberl et al. | |

| | | | | |
|---|---|---|---|---|
| 5,558,174 A | * | 9/1996 | Avitan ................ | B66F 9/07595 |
| | | | | 74/420 |
| 7,137,470 B2 | * | 11/2006 | Gotz .................... | B60K 7/0007 |
| | | | | 280/267 |
| 2003/0193233 A1 | | 10/2003 | Brant | |
| 2006/0118662 A1 | | 6/2006 | Korus | |
| 2009/0159392 A1 | * | 6/2009 | Vaughn .................. | F16D 13/38 |
| | | | | 192/49 |
| 2010/0155168 A1 | * | 6/2010 | Mies .................... | B60K 7/0007 |
| | | | | 180/300 |
| 2017/0129522 A1 | * | 5/2017 | Lee .......................... | B60K 1/04 |
| 2017/0251589 A1 | * | 9/2017 | Tippery ................. | A01G 25/09 |
| 2021/0068373 A1 | | 3/2021 | Greive et al. | |

(Continued)

FOREIGN PATENT DOCUMENTS

| | | | | | |
|---|---|---|---|---|---|
| CN | 103534180 A | * | 1/2014 | ............. | B21D 51/36 |
| CN | 111937759 A | | 11/2020 | | |

OTHER PUBLICATIONS

Translation of CN-103534180-A (Year: 2014).*

(Continued)

*Primary Examiner* — Christopher B Wehrly

(57) ABSTRACT

In general, one aspect disclosed features an apparatus comprising: a mobile agricultural structure; and at least one wheel assembly mechanically coupled to the mobile agricultural structure, wherein each wheel assembly comprises: two or more wheels, a motor disposed between two of the wheels, a drive transference mechanically coupled to the motor and the wheels, wherein the motor is configured to turn the drive transference and the wheels together, a housing, wherein the motor is enclosed by the housing, and a rotatable mechanical linkage mechanically coupled between the housing and the mobile agricultural structure.

18 Claims, 7 Drawing Sheets

(56) References Cited

U.S. PATENT DOCUMENTS

| 2021/0169000 A1* | 6/2021 | Yamagishi | ............. A01D 69/02 |
| 2021/0281146 A1* | 9/2021 | Schulenberg | ...... H02K 11/0094 |
| 2024/0040993 A1* | 2/2024 | Brauer | ................. A01K 29/005 |

OTHER PUBLICATIONS

International Search Report and Written Opinion for Application No. PCT/US2022/045449, mailed on Jan. 6, 2023, 8 pages.
International Preliminary Report on Patentability for Application No. PCT/US2022/045449, mailed on Apr. 11, 2024, 7 pages.
Extended European Search Report for Application No. 22877409.7, mailed on Jul. 9, 2025.

* cited by examiner

Dually Wheel Assembly 300

DUALLY DRIVE WHEEL ASSEMBLY

DESCRIPTION OF RELATED ART

The disclosed technology relates generally to drive wheel mechanisms.

BACKGROUND

Conventional livestock production uses stationary facilities. Due to their stationary nature, livestock in conventional facilities often live in dirty litter and/or fecal matter. As such, facilities require vaccines, antibiotics and/or other drugs, and/or increased management practices to keep livestock healthy. Stationary facilities also require litter, bedding, and/or waste disposal/removal which leads to high materials costs, elevated labor costs, and environmental concerns. Furthermore, livestock that are treated with vaccines, drugs, and antibiotics, which may subsequently lead to negative health effects on humans that consume their meat and eggs.

For these reasons, there is an increasing interest in pasture raising livestock. However, existing methods of pasture raising livestock are expensive for both farmers and consumers, and thus are typically limited to small scale production. The amount of land and labor required to manage a large quantity of grazing livestock has typically prevented pasture raised livestock from being scalable for commercial livestock farmers.

SUMMARY

In general, one aspect disclosed features an apparatus comprising: a mobile agricultural structure; and at least one wheel assembly mechanically coupled to the mobile agricultural structure, wherein each wheel assembly comprises: two or more wheels, a motor disposed between two of the wheels, a drive transference mechanically coupled to the motor and the wheels, wherein the motor is configured to turn the drive transference and the wheels together, a housing, wherein the motor is enclosed by the housing, and a rotatable mechanical linkage mechanically coupled between the housing and the mobile agricultural structure.

Embodiments of the apparatus may include one or more of the following features. In some embodiments, the motor is an electric motor. In some embodiments, the motor is a three-phase motor. In some embodiments, the motor is a DC motor. In some embodiments, the motor is a hollow-bore motor. In some embodiments, the rotatable mechanical linkage comprises a lock, wherein when the lock is engaged, the housing does not rotate with respect to the mobile agricultural structure. In some embodiments, the lock comprises: a plurality of slotted grooves; and a movable pin, wherein the movable pin is moved into one of the slotted grooves to engage the lock.

In general, one aspect disclosed features an apparatus comprising: a mobile fence; and at least one wheel assembly mechanically coupled to the mobile fence, wherein each wheel assembly comprises: two or more wheels, a motor disposed between two of the wheels, a drive transference mechanically coupled to the motor and the wheels, wherein the motor is configured to turn the drive transference and the wheels together, a housing, wherein the motor is enclosed by the housing, and a rotatable mechanical linkage mechanically coupled between the housing and the mobile fence.

Embodiments of the apparatus may include one or more of the following features. In some embodiments, the motor is an electric motor. In some embodiments, the motor is a three-phase motor. In some embodiments, the motor is a DC motor. In some embodiments, the motor is a hollow-bore motor.

In general, one aspect disclosed features an apparatus comprising: two or more wheels; a motor disposed between two of the wheels; a drive transference mechanically coupled to the motor and the wheels; and wherein the motor is configured to turn the drive transference and the wheels together.

Embodiments of the apparatus may include one or more of the following features. In some embodiments, the motor is an electric motor. In some embodiments, the motor is a three-phase motor. In some embodiments, the motor is a DC motor. In some embodiments, the motor is a hollow-bore motor. Some embodiments comprise a housing, wherein the motor is enclosed by the housing. Some embodiments comprise a platform; and a rotatable mechanical linkage mechanically coupled between the housing and the platform. In some embodiments, the rotatable mechanical linkage comprises a lock, wherein when the lock is engaged, the housing does not rotate with respect to the platform. In some embodiments, the lock comprises: a plurality of slotted grooves; and a movable pin, wherein the movable pin is moved into one of the slotted grooves to engage the lock. In some embodiments, the platform is a mobile agricultural structure. In some embodiments, the platform is a mobile fence.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

In response to the above-described problems with conventional methods of livestock production, mobile livestock enclosures have been developed. To move the enclosures, motor-driven wheel assemblies have been developed. Each assembly has a single wheel driven by a motor, with the single wheel being mounted within a fork-shaped housing. But due to this mounting arrangement, it is difficult to access the wheel, for example tire reflation, tire changes, and other maintenance of the tires and wheels.

Furthermore, with these designs the wheels tend to sink into soft pastures, and may lose traction with a pasture that may be wet, inclined, or both. One possible solution is to increase the surface area of the tires. But these large tires are extremely expensive and difficult to source. In addition, the tire size is limited by the size of the housing.

Embodiments of the disclosure address these problems by providing a dually drive wheel assembly. One use of these assemblies is to move a mobile agricultural structure such as a mobile livestock enclosure. For clarity, embodiments of the disclosed technology are described herein with reference to a mobile livestock enclosure. But it should be appreciated that the disclosed embodiments may be used to move other structures, platforms, and the like. For example, the dually drive wheel assembly may be used to move livestock shade structures. Animals such as cows and swine are drawn to the shade, and will follow the shade structure from place to place, thereby allowing the operator to control the grazing areas for these animals. As another example, the dually drive wheel assembly may be used to move fences, for example by mounting the dually drive wheel assemblies to fenceposts. The use of the dually drive wheel assembly to move other structures is contemplated. First, examples of a mobile livestock enclosure and a mobile fence will be described.

Figure 1:
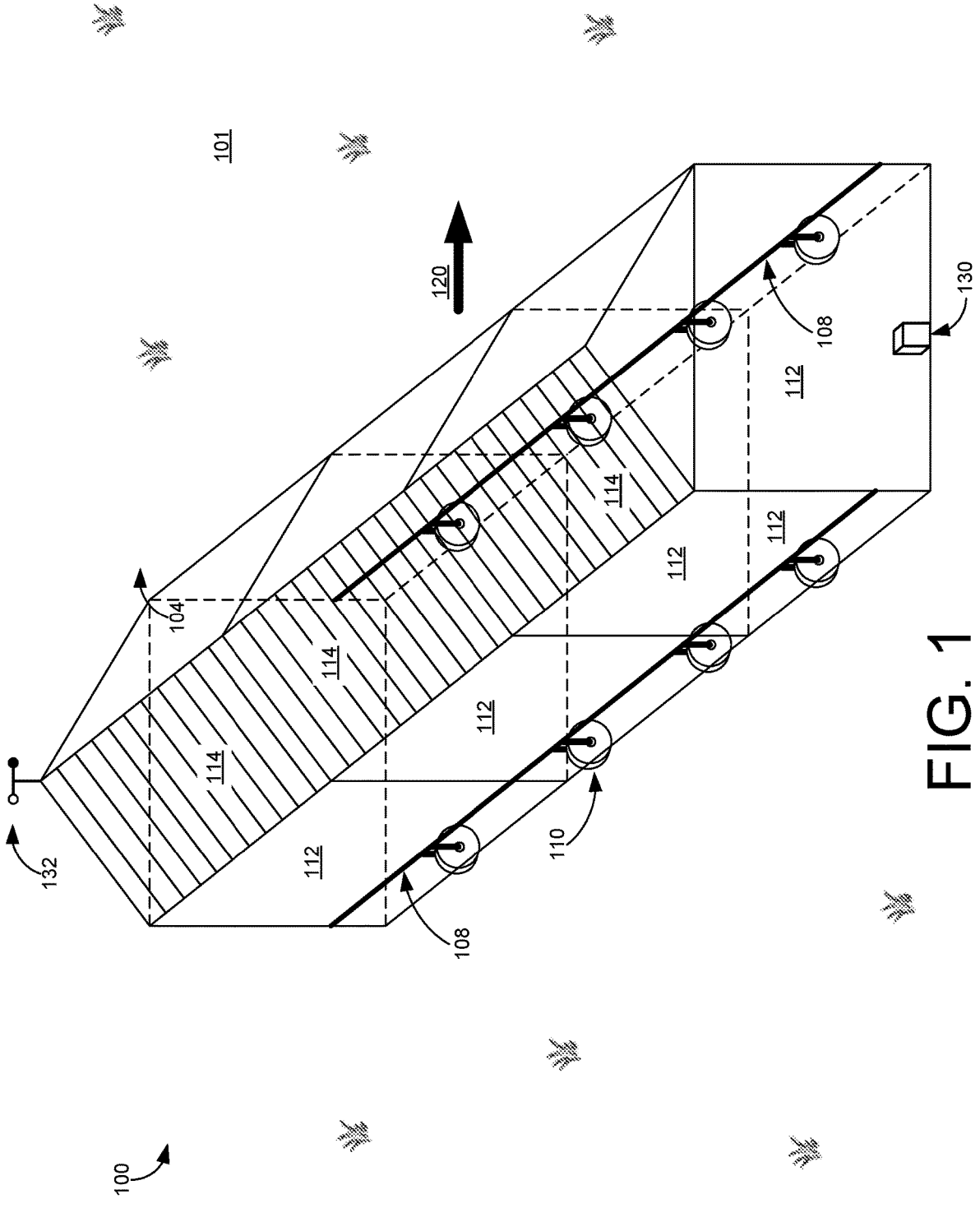
FIG. 1 illustrates an example mobile livestock enclosure, in accordance with one or more implementations.

FIG. 1 illustrates an example mobile livestock enclosure, in accordance with one or more implementations. The mobile livestock enclosure 100 may be moved and/or may move across a pasture 101. In some implementations, the livestock enclosure 100 may include a frame 108. In some embodiments, the frame 108 may be constructed from 8"×¼" flat metal bar. In other embodiments, the frame 108 may be constructed from other materials.

The mobile livestock enclosure 100 may include multiple wall barriers 112 and/or roof barriers 114. The wall barriers 112 and/or roof barriers 114 may at least partially form the enclosure and/or contain the livestock within the enclosure. The wall barriers 112 and/or roof barriers 114 may be coupled to the frame 108. In some implementations, the wall barriers 112 and/or roof barriers 114 may be resiliently flexible. By way of non-limiting example, the wall barriers 112 and/or roof barriers 114 may be made of fences, walls, netting, wood, paneling, mesh, wire, cloth, metal sheeting, shingles, tarpaper, windows, canvas, plastic, tarp, rubber, other materials, or a combination thereof. In some embodiments, one or more wall barriers 112 (e.g., the outer walls) may consist of chicken wire or a comparable predator-deterring barrier that doesn't prevent fresh air and sunlight from entering the enclosure 100. In some embodiments, for example, one or more portions of wall barriers 112 may include canvas, plastic, and/or another material that rolls up/down for temperature regulation (the deployment of which may automated, including by thermostatic regulation). In some implementations, the one or more wall barriers 112 may have multiple layers with one or more slits along its length in order to conform to the contours of the pasture and/or close any gaps through which the livestock could escape.

The mobile livestock enclosure 100 may be all or partially floorless. As such, the livestock contained in the enclosure 100 may be able to graze on a portion of the pasture 101. The enclosure 100 may include a chassis with wheels 110 that allows the enclosure 100 to move across the pasture 101, as indicated by the arrow at 120. One or more of the wheels 110 may be implemented as the disclosed dually wheel drive.

In some embodiments the enclosure 100 may include one or more brakes to prevent the wheels 110 from turning. The enclosure 100 may include a controller 130. The controller 130 may be configured to operate the brakes and the dually wheel drives.

Figure 2:
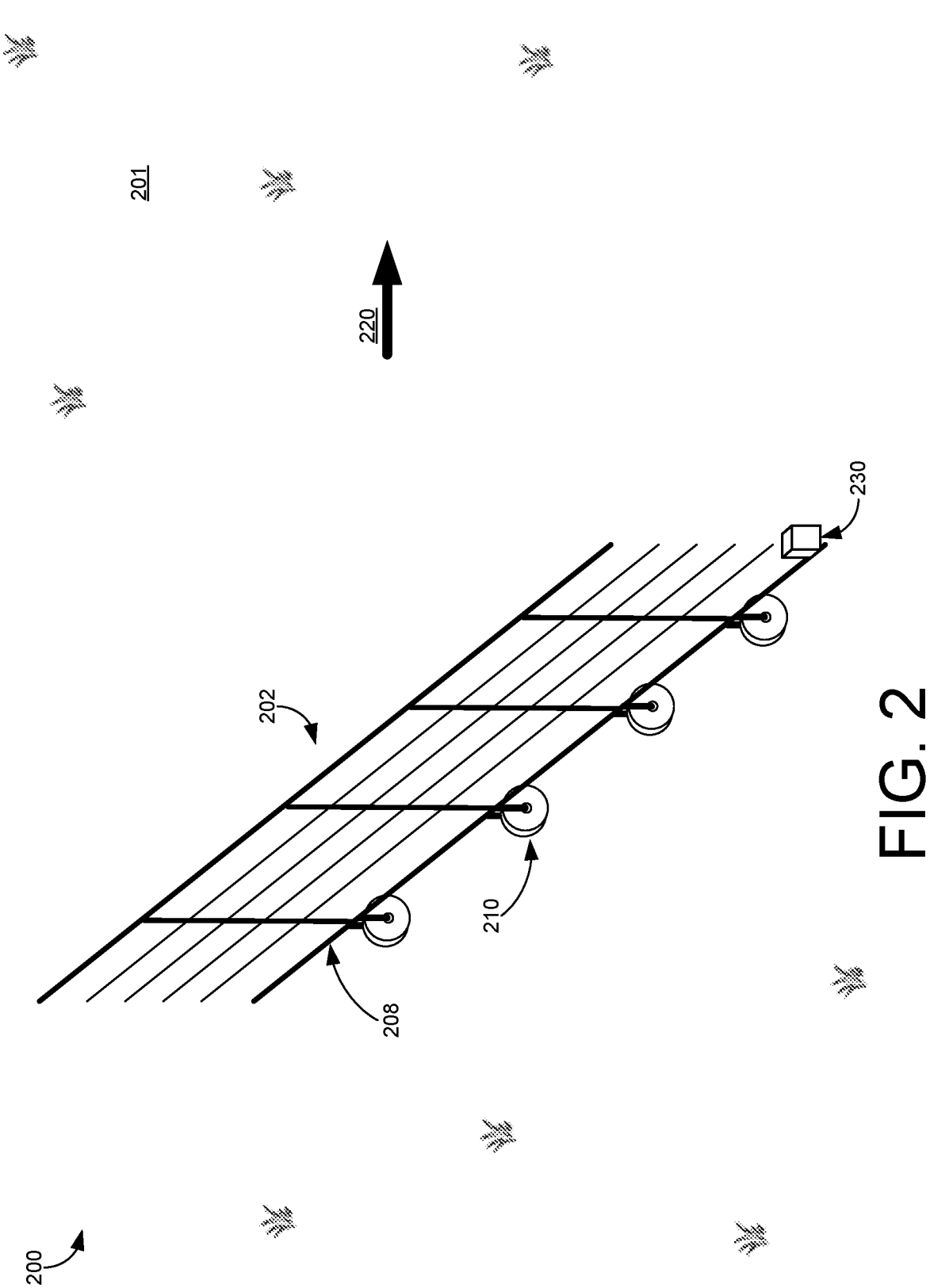
FIG. 2 illustrates an example mobile fence, in accordance with one or more implementations.

FIG. 2 illustrates an example mobile fence, in accordance with one or more implementations. The mobile fence 200 may be moved and/or may move across a pasture 201. In some implementations, the mobile fence 200 may include a frame 208. In some embodiments, the frame 208 may be constructed from 8"×¼" flat metal bar. In other embodiments, the frame 208 may be constructed from other materials.

The mobile fence 200 may include a fence 202. The fence 202 may be attached to the frame 208. The fence 200 may include a chassis with wheels 210 that allows the mobile fence 200 to move across the pasture 201, as indicated by the arrow at 220. One or more of the wheels 210 may be implemented as the disclosed dually wheel drive.

In some embodiments the fence 200 may include one or more brakes to prevent the wheels 210 from turning. The fence 200 may include a controller 230. The controller 230 may be configured to operate the brakes and the dually wheel drives.

Figure 3:
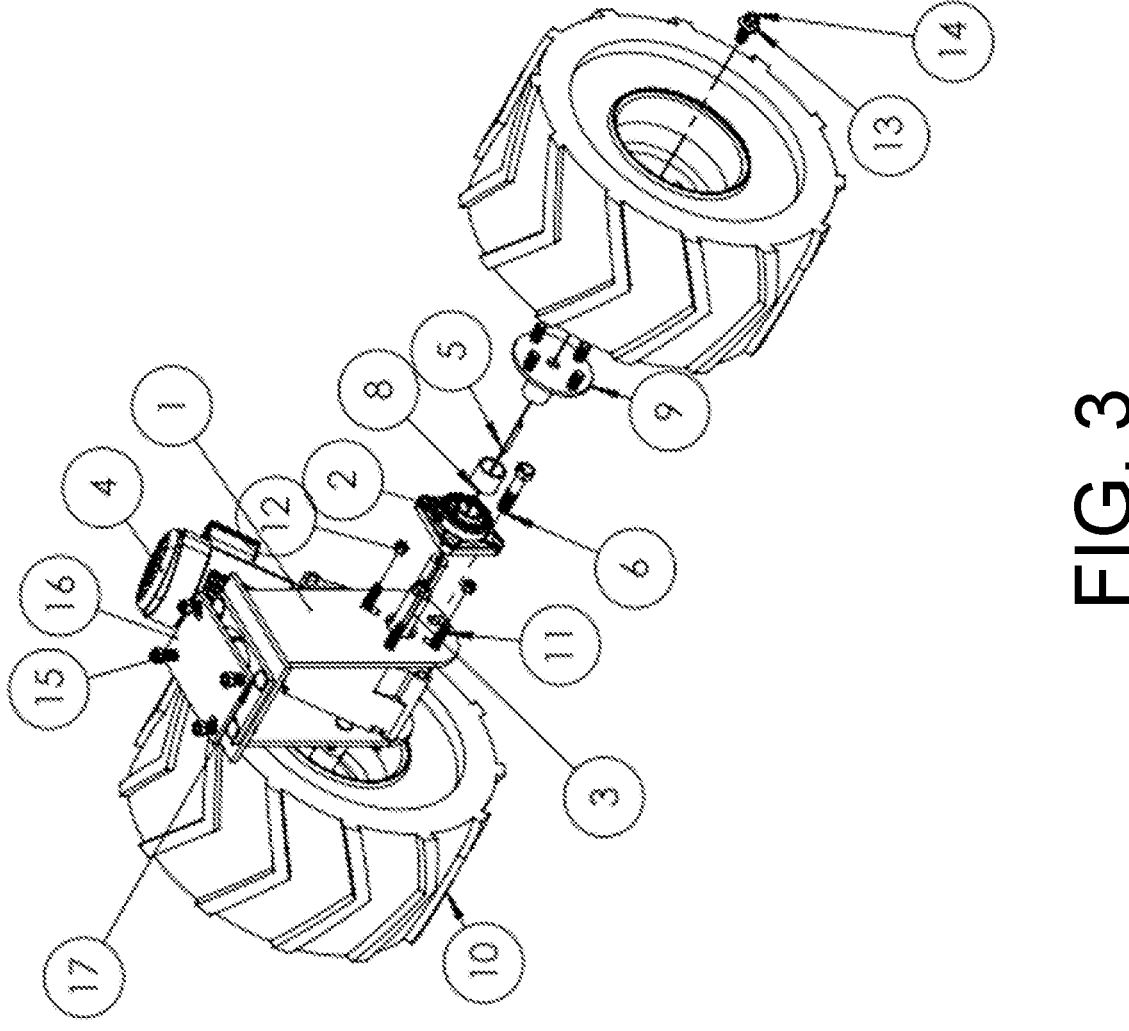
FIG. 3 is an exploded view of a dually wheel drive assembly according to some embodiments of the disclosed technologies.
Figure 4:
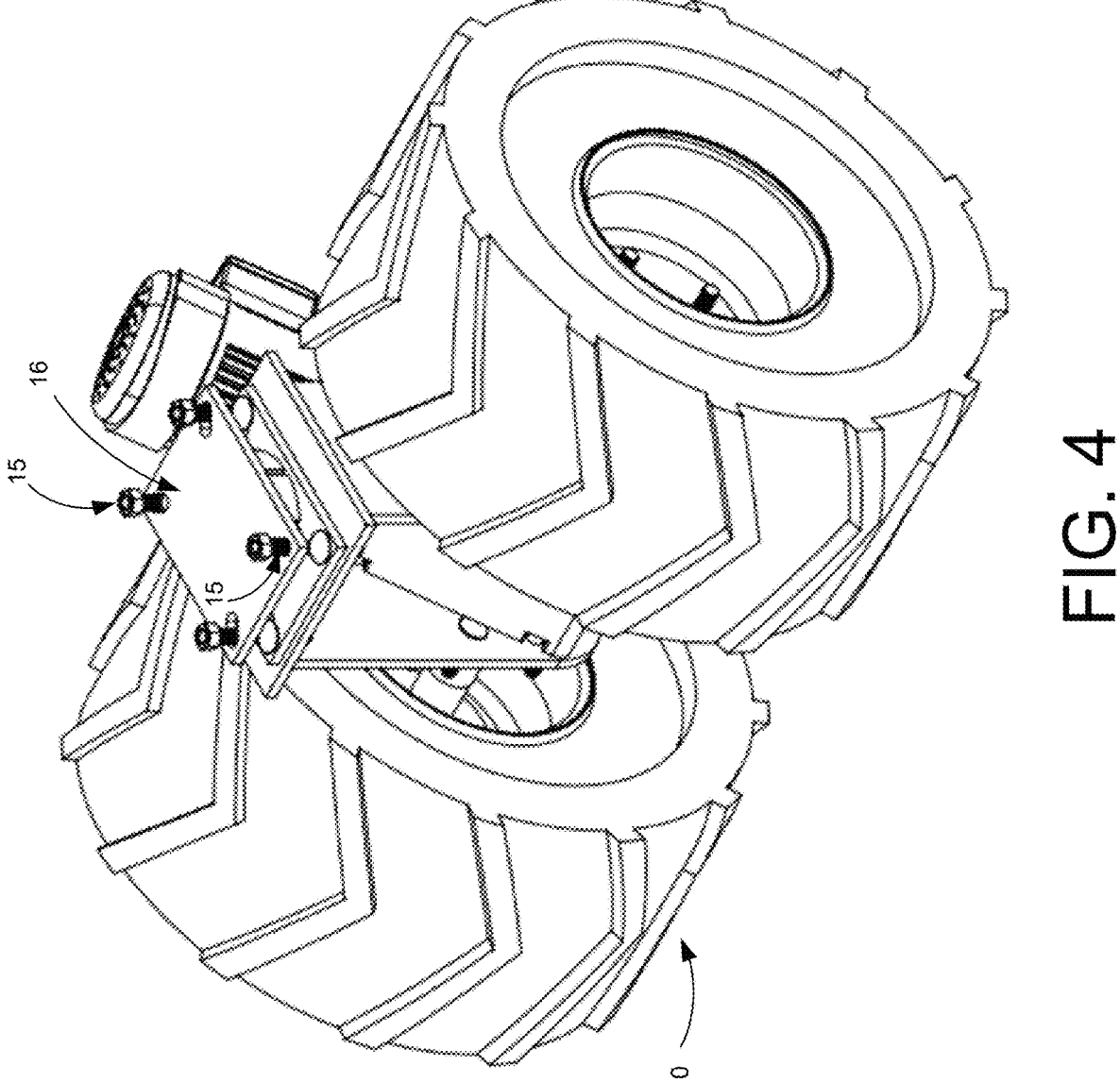
FIG. 4 is an perspective view of the assembled dually wheel drive assembly according to some embodiments of the disclosed technologies.

FIG. 3 is an exploded view of a dually wheel drive assembly 300 according to some embodiments of the disclosed technologies. FIG. 4 is an perspective view of the assembled dually wheel drive assembly 300 according to some embodiments of the disclosed technologies.

Referring to FIG. 2, the dually wheel drive assembly 300 may include two wheels 10 and a motor 4 disposed between the two wheels. In some embodiments, the dually wheel drive assembly 300 may include additional wheels. In some embodiments, the motor 4 is an electric motor. For example, the motor 4 may be a three-phase electric motor. Three-phase electric motors possess advantages including the ability to adjust the speed of the motor, and to smoothly adjust the speed of the wheels, thereby reducing power spikes. In some embodiments, the motor 4 is a DC motor. In some embodiments, the motor 4 is a hollow-bore motor. In some embodiments, the motor 4 may be remotely controlled, for example via controller 130 of FIG. 1 by a device such as a smartphone.

Referring again to FIG. 3, the dually wheel drive assembly 300 may include an axle 3 mechanically coupled to the motor 4 and the wheels 10. The motor 4 may turn the axle 3 and the wheels 10 together. The axle 3 may be coupled to each wheel 10 by a wheel hub 9. Each wheel 10 may be coupled to a respective hub 9 by a bolt 14 and washer 13. In other embodiments, the axle 3 may be replaced with a drive transference other than an axle, or that includes an axle. For example, the drive transference may include constant-velocity (CV) joints, differentials, and/or other drive system components.

In some embodiments, the axle 3 may be coupled to one or more of the wheel hubs 9 by compression. The compression may be implemented by tightening a bolt, by operating a clutch, or by a similar mechanism. These mechanisms may be operated by one or more actuators, which may be controlled by the controller 130 of FIG. 1. In some embodiments, the dually wheel drive assembly 300 may include a key 5 and a keyway axle bushing 8, and the axle 3 and one or more of the wheel hubs 9 may be keyed to ensure they rotate together. In some embodiments, one wheel hub 9 may be keyed, while the other wheel hub 9 may be coupled to the axle 3 by compression. In some embodiments, one or more of the wheels 10 may rotate with respect to the axle 3.

The dually wheel drive assembly 300 may include a housing 1. The housing 1 may be fabricated from any rigid durable material. For example, the housing 1 may be fabricated from steel or aluminum. The housing 1 may be mechanically coupled to the motor 4. For example, the housing 1 may be mechanically coupled to the motor 4 by carriage bolts 11 and nylon washers 12. In some embodiments, the housing 1 may partially or fully enclose the motor 4, for example as shown in FIGS. 3 and 4. In such embodiments, the housing 1 may serve to protect the motor 4 from weather, soil, and other contaminants.

The housing 1 may have one or more openings that allow the axle 3 to pass through to the motor 4. The dually wheel drive assembly 300 may include a flange bearing 2 through which the axle 3 passes. The flange bearing 2 may be mechanically coupled to the housing 1. For example, the flange bearing 2 may be mechanically coupled to the housing 1 by one or more bolts.

The dually wheel drive assembly 300 may include a turntable bearing 16. The turntable bearing 16 may be mechanically coupled to the housing 1, for example as shown in FIGS. 1 and 2. For example, the turntable bearing 16 may be mechanically coupled to the housing 1 by one or more bolts. The turntable bearing 16 may be mechanically coupled to the mobile livestock enclosure 100 of FIG. 1. For example, the turntable bearing 16 may be mechanically coupled to the mobile livestock enclosure 100 by one or more bolts 17 and nuts 15. The turntable bearing 16 may allow the dually wheel drive assembly 300 to rotate with respect to the mobile livestock enclosure 100. This rotation may allow the mobile livestock enclosure 100 to move in any direction. In other embodiments, the turntable bearing 16 may be replaced with a rotatable mechanical linkage other than a turntable bearing, or that includes a turntable bearing. For example, the rotatable mechanical linkage may include spindle hub assemblies, shaft and sleeve assemblies or any other similar rigid attachment permitting rotation.

Figure 5:
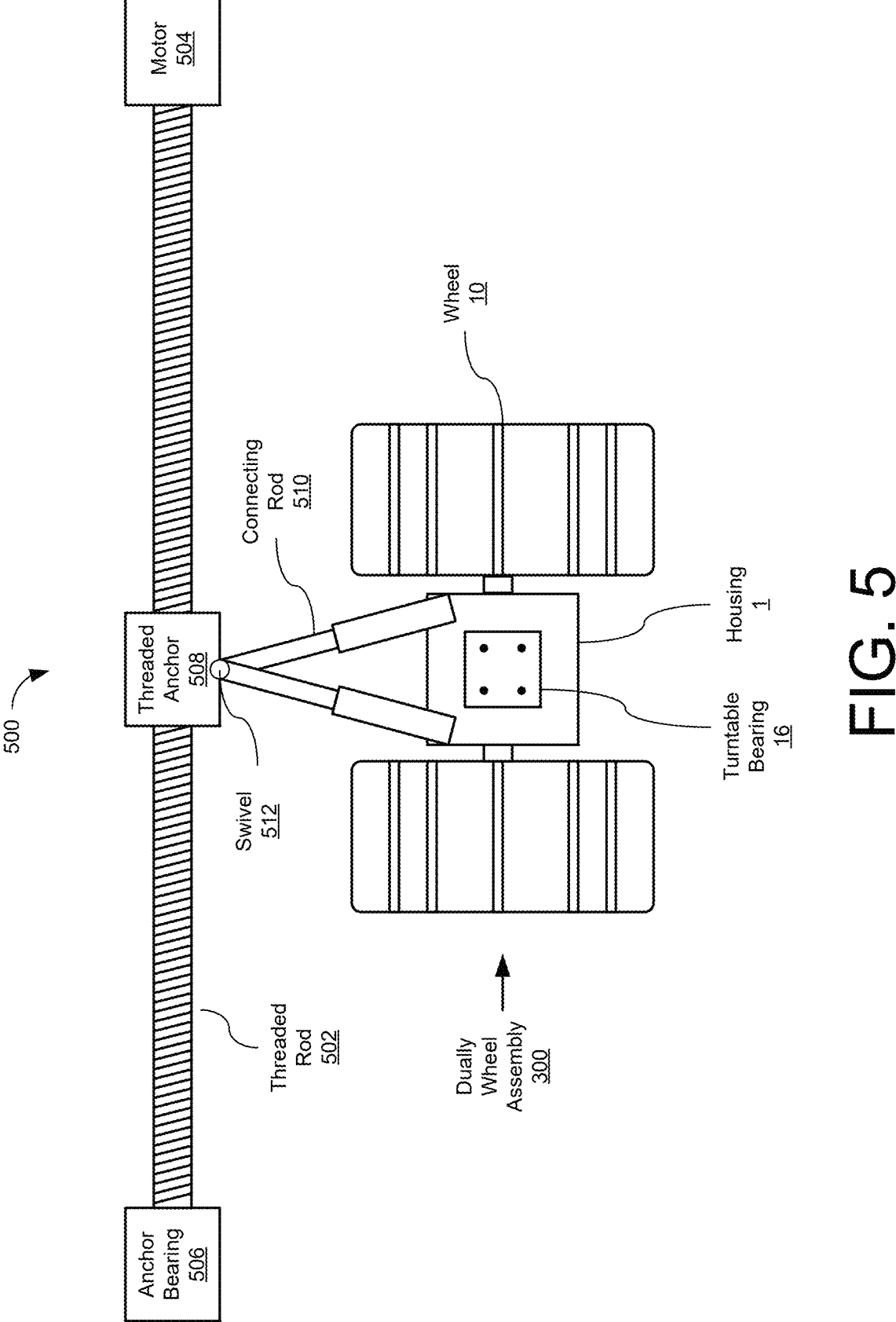
FIG. 5 illustrates a top view of a steering assembly according to some embodiments of the disclosed technologies.

In some embodiments, the dually wheel drive assembly 300 may include a steering assembly. Referring to FIG. 5, the steering assembly 500 includes a threaded rod 502. The threaded rod may be rotated about its longitudinal axis by a motor 504. The motor 504 may be an electric motor. In some embodiments, the motor 504 may be remotely controlled, for example via controller 130 of FIG. 1 by a device such as a smartphone.

The threaded rod 502 may be supported at its opposite end by an anchor bearing 506. The threaded rod 502 may pass through a threaded anchor 508. The threaded anchor 508 may have a swivel 512. A pair of connecting rods 510 may connect the swivel 512 to the housing 1 of the dually wheel drive assembly 300. The connecting rods 510 may telescope. The motor 504, anchor bearing 506, and turntable bearing 16 may be connected to the mobile livestock enclosure 100 of FIG. 1. As the threaded rod 502 rotates, the threaded anchor 508 moves along the length of the threaded rod 502, thereby rotating the dually wheel drive assembly 300 about the turntable bearing 16, thereby changing the direction of the dually wheel drive assembly 300, and the direction in which the mobile livestock enclosure 100 may be moved.

Figure 6:
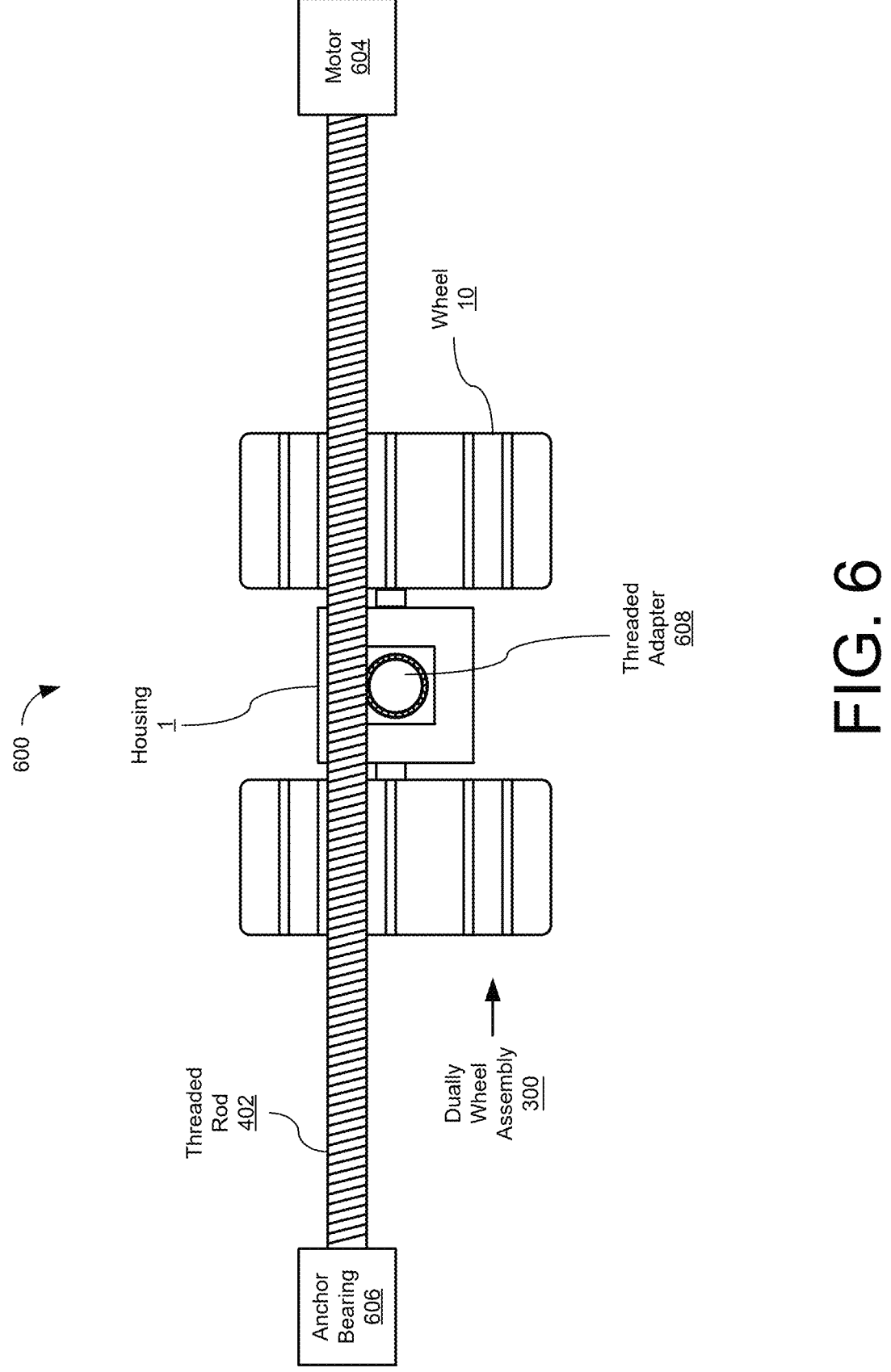
FIG. 6 illustrates a top view of another steering assembly according to some embodiments of the disclosed technologies.

FIG. 6 illustrates a top view of another steering assembly 600 according to some embodiments of the disclosed technologies. Referring to FIG. 6, the steering assembly 600 includes a threaded rod 602. The threaded rod 602 may be rotated about its longitudinal axis by a motor 604. The motor 604 may be an electric motor. In some embodiments, the motor 604 may be remotely controlled, for example via controller 130 of FIG. 1 by a device such as a smartphone.

The threaded rod 602 may be supported at its opposite end by an anchor bearing 606. The motor 604, anchor bearing 606, and turntable bearing 16 may be connected to the mobile livestock enclosure 100 of FIG. 1. The steering assembly 600 may include a threaded adapter 608. The turntable bearing 16 may be mechanically coupled to the housing 1. As the threaded rod 602 rotates, it causes the threaded adapter 608 and housing 1 to rotate, thereby rotating the dually wheel drive assembly 300 about the turntable bearing 16, thereby changing the direction of the dually wheel drive assembly 300, and the direction in which the mobile livestock enclosure 100 may be moved.

Figure 7:
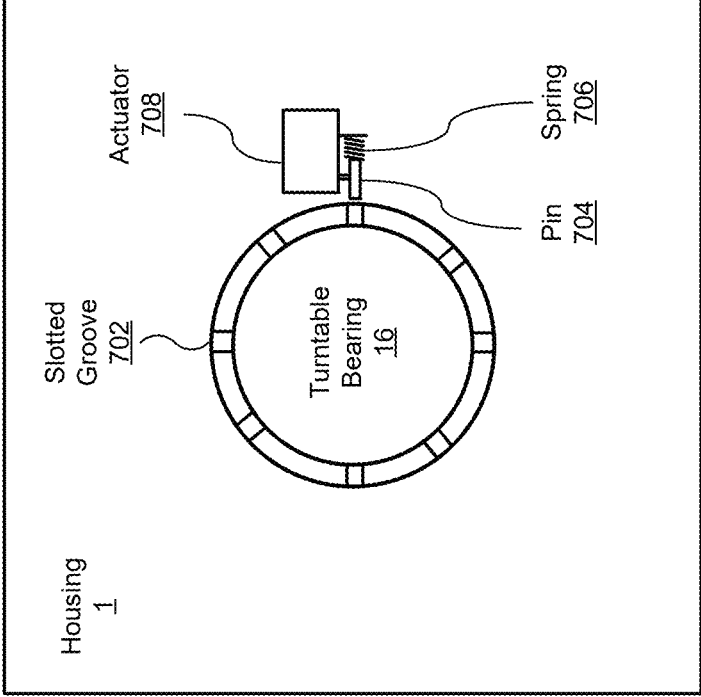
FIG. 7 illustrates a top view of portion of a dually wheel drive assembly with a rotation lock according to some embodiments of the disclosed technologies.
Figure 7:
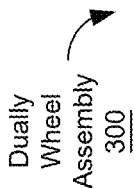

In some embodiments, the turntable bearing 16 may include a rotation lock. In such embodiments, when the rotation lock is engaged, the housing 1 does not rotate with respect to the mobile livestock enclosure 100. FIG. 7 illustrates a top view of portion of a dually wheel drive assembly 300 with a rotation lock according to some embodiments of the disclosed technologies. Referring to FIG. 7, the lock may include a plurality of slotted grooves 702. The slotted grooves 702 may be formed in the turntable bearing 16, as shown in FIG. 7. The lock may include a movable pin 704. The movable pin 704 may be moved into one of the slotted grooves 702 to engage the lock. The movable pin 704 may be biased by a spring 706 to be held in one of the slotted grooves 702. In some embodiments, the movable pin 704 may be manually operated. In some embodiments, the movable pin 704 may be operated by an actuator 708. For example, the actuator 708 may be implemented as a solenoid or similar device. In some embodiments, the actuator 708 may be remotely controlled, for example via controller 130 of FIG. 1 by a device such as a smartphone.

In some embodiments, one of the wheels 10 may be configured to rotate with respect to the axle 3. For example, the hub 9 for that wheel may be implemented as a lockable hub. With this arrangement, changing the direction of the mobile livestock enclosure 100 may be implemented in the following manner. The hub 9 may be unlocked, and the rotation lock disengaged. Then the motor 4 may be operated. With only one wheel 10 being driven by the motor 4, the dually wheel drive assembly 300 rotates with respect to the enclosure 100, thereby changing the direction of the enclosure 100. The rotation lock may then be engaged, and the unlocked hub may be locked. Operating the motor will now propel the enclosure 100 in the chosen direction using both wheels 10. This process may be repeated for each dually wheel drive assembly 300 in the enclosure 100. In some embodiments, this process may be automated, for example by the controller 130 of FIG. 1.

Embodiments of the disclosed technologies provide several advantages. By doubling the number of tires in each assembly, the surface area of the tires is also doubled, resulting in vastly improved floatation and traction. And by placing the motor and housing between the wheels, the wheels are easily accessed for maintenance, and the diameter and width of the tires are not restricted by the size of the housing. Mounting the motor within the housing, with the tires outside the housing, also protects the motor from the elements.

The use of a hollow-bore motor simplifies the assembly by elimination extra parts such as drive belts, pulleys, chains and sprockets. And by eliminating these parts, the overhung load of the motor is greatly reduced.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An apparatus comprising:
a mobile agricultural structure comprising a floorless enclosure with multiple wall barriers and a roof barrier; and
multiple wheel assemblies mechanically coupled to the mobile agricultural structure, wherein each wheel assembly comprises:
two or more wheels with one or more lockable hubs,
a motor disposed between two of the wheels,
a drive transference mechanically coupled to the motor and the wheels via the one or more lockable hubs, wherein the motor is configured to turn the drive transference and the wheels together when all of the one or more lockable hubs are locked, and wherein when one of the one or more lockable hubs is unlocked, the motor is configured to turn the drive transference and only half of the two or more wheels, such that where each wheel assembly comprises two wheels and one of the one or more lockable hubs is unlocked, one wheel is turned by the motor allowing the wheel assembly to change direction of the mobile agricultural structure, and
such that where each wheel assembly comprises more than two wheels, half of the more than two wheels are turned by the motor allowing the wheel assembly to change direction of the mobile agricultural structure; and
a housing, wherein the motor is enclosed by the housing and the housing is disposed between two of the wheels.

2. The apparatus of claim 1, wherein:
the motor is an electric motor.

3. The apparatus of claim 2, wherein:
the motor is a three-phase motor.

4. The apparatus of claim 2, wherein:
the motor is a DC motor.

5. The apparatus of claim 1, wherein:
the motor is a hollow-bore motor.

6. The apparatus of claim 1, further comprising a rotatable mechanical linkage mechanically coupled between the housing and the mobile agricultural structure, wherein:
the rotatable mechanical linkage comprises a lock, wherein when the lock is engaged, the housing does not rotate with respect to the mobile agricultural structure.

7. The apparatus of claim 6, wherein the lock comprises:
a plurality of slotted grooves; and
a movable pin, wherein the movable pin is moved into one of the slotted grooves to engage the lock.

8. An a mobile agricultural structure comprising a floorless enclosure with multiple wall barriers and a roof barrier comprising:
two or more wheels with one or more lockable hubs;
a motor disposed between two of the wheels with a housing enclosing the motor;
a drive transference mechanically coupled to the motor and the wheels via the one or more lockable hubs; and
wherein the motor is configured to turn the drive transference and the wheels together when all of the one or more lockable hubs are locked, and wherein when one of the one or more lockable hubs is unlocked, the motor is configured to turn the drive transference and only some of the two or more wheels allowing the wheel assembly to change direction of the mobile agricultural structure.

9. The apparatus of claim 8, wherein:
the motor is an electric motor.

10. The apparatus of claim 9, wherein:
the motor is a three-phase motor.

11. The apparatus of claim 9, wherein:
the motor is a DC motor.

12. The apparatus of claim 8, wherein:
the motor is a hollow-bore motor.

13. The apparatus of claim 8, further comprising:
the housing, wherein the motor is enclosed by the housing.

14. The apparatus of claim 13, further comprising:
a platform; and
a rotatable mechanical linkage mechanically coupled between the housing and the platform.

15. The apparatus of claim 14, wherein:
the rotatable mechanical linkage comprises a lock, wherein when the lock is engaged, the housing does not rotate with respect to the platform.

16. The apparatus of claim 15, wherein the lock comprises:
a plurality of slotted grooves; and
a movable pin, wherein the movable pin is moved into one of the slotted grooves to engage the lock.

17. The apparatus of claim 14, wherein:
the platform is a mobile agricultural structure.

18. The apparatus of claim 14, further comprising:
the platform is a mobile fence.

* * * * *